US006993365B2

(12) United States Patent  (10) Patent No.: US 6,993,365 B2
Fujino et al.  (45) Date of Patent: Jan. 31, 2006

(54) WATERPROOF TRANSCEIVER HAVING PTT SWITCH, SOUND INPUT/OUTPUT PORTION AND MAIN PORTION FORMED INTO INDEPENDENT UNITS

(75) Inventors: Shouji Fujino, Tokyo (JP); Mikio Fukuda, Tokyo (JP); Jiro Nawa, Tokyo (JP)

(73) Assignee: Temco Japan Co., Ltd., Tokyo (JP)

( * ) Notice: Subject to any disclaimer, the term of this patent is extended or adjusted under 35 U.S.C. 154(b) by 544 days.

(21) Appl. No.: 10/030,714

(22) PCT Filed: May 11, 2001

(86) PCT No.: PCT/JP01/03935

§ 371 (c)(1),
(2), (4) Date: Jan. 14, 2002

(87) PCT Pub. No.: WO01/86829

PCT Pub. Date: Nov. 15, 2001

(65) Prior Publication Data

US 2003/0008688 A1 Jan. 9, 2003

(30) Foreign Application Priority Data

May 12, 2000 (JP) ............................. 2000-140307

(51) Int. Cl.
H04M 1/00 (2006.01)

(52) U.S. Cl. ................. 455/569.1; 455/90.1; 455/90.2; 455/90.3; 455/518; 455/550.1; 455/556.1; 455/557; 455/575.1; 455/3.01

(58) Field of Classification Search ................ 455/518, 455/519, 3.05, 3.01, 550.1, 556.1, 557, 559, 455/569.1, 575.1, 575.2, 90.1, 90.2, 90.3
See application file for complete search history.

(56) References Cited

U.S. PATENT DOCUMENTS 3,746,789 A * 7/1973 Alcivar ........................ 379/175
5,251,326 A    10/1993 Silverman

FOREIGN PATENT DOCUMENTS

| JP | 63-97088 A | | 4/1988 |
| JP | 2-150841 U | | 12/1990 |
| JP | 4-83300 A | | 3/1992 |
| JP | 08-056174 | * | 2/1996 |
| JP | 8-56174 A | | 2/1996 |
| JP | 8-293817 A | | 11/1996 |
| JP | 09-172697 | * | 6/1997 |
| JP | 9-172697 A | | 6/1997 |
| JP | 10-65556 A | | 3/1998 |

* cited by examiner

Primary Examiner—Nay Maung
Assistant Examiner—Shaima Q. Aminzay
(74) Attorney, Agent, or Firm—Browdy and Neimark, PLLC

(57) ABSTRACT

A transceiver, which is capable of being used even in a severe situation such as situations in salvage operations and the like in which the transceiver is often submerged, is composed of: a PTT switch for transmitting an audio signal upon depression of the switch; a sound input/output portion for inputting and outputting a sound; and a main body portion for transmission and reception of a radio signal. All of the above components except the main body portion are formed into independent and connecting cables are provided between the independent units and the main body.

3 Claims, 1 Drawing Sheet

WATERPROOF TRANSCEIVER HAVING PTT SWITCH, SOUND INPUT/OUTPUT PORTION AND MAIN PORTION FORMED INTO INDEPENDENT UNITS

REFERENCE TO RELATED APPLICATIONS

The present application is the national stage under 35 U.S.C. §371 of international application PCT/JP01/03935, filed May 11, 2001 which designated the United States, and which application was not published in the English language.

FIELD OF THE INVENTION

The present invention relates to a transceiver, and more particularly to a transceiver, which is capable of functioning in a severe situation, for example, in those of salvage operations and the like.

BACKGROUND OF THE INVENTION

In general, a transceiver is portable and therefore used outdoors in most cases. Due to this, the transceiver has been downsized with the spread thereof in use. The transceiver has its speaker and its microphone incorporated in its body. Each of the speaker and the microphone of the transceiver is of an air-conduction type using aerial vibrations. Due to this, the transceiver is inherently poor in waterproofness.

This type of transceiver is effective in daily use and does not suffer from any problem. However, in case that, the transceiver is submerged during an underwater operation, for example such as salvage operations and the like, a diaphragm used in each of the speaker and the microphone of the transceiver is subjected to water and deformed under the effect of the water pressure, which often leads to a malfunction of the transceiver. Further, since it is not possible for a user to operates the transceiver in a hands-free mode, it is difficult for the user to use the transceiver in a situation in which the user must jump into the sea from a helicopter.

In view of the above problem inherent in the prior art, the present invention was made. Consequently, it is an object of the present invention to provide a transceiver, which is waterproofed and capable of being used even in a severe situation such as situations in salvage operations and the like.

SUMMARY OF THE INVENTION

The present invention solves the above problems by providing a transceiver comprising: a PTT switch for transmitting an audio signal upon depression of the switch; a sound input/output portion for inputting and outputting a sound; a main body portion for transmission and reception of a radio signal; wherein all the above components except the main body portion are formed into independent units; wherein means for transmitting and receiving a signal between the independent units and the main body portion is provided.

BEST MODE FOR CARRYING OUT THE INVENTION

Figure 1:
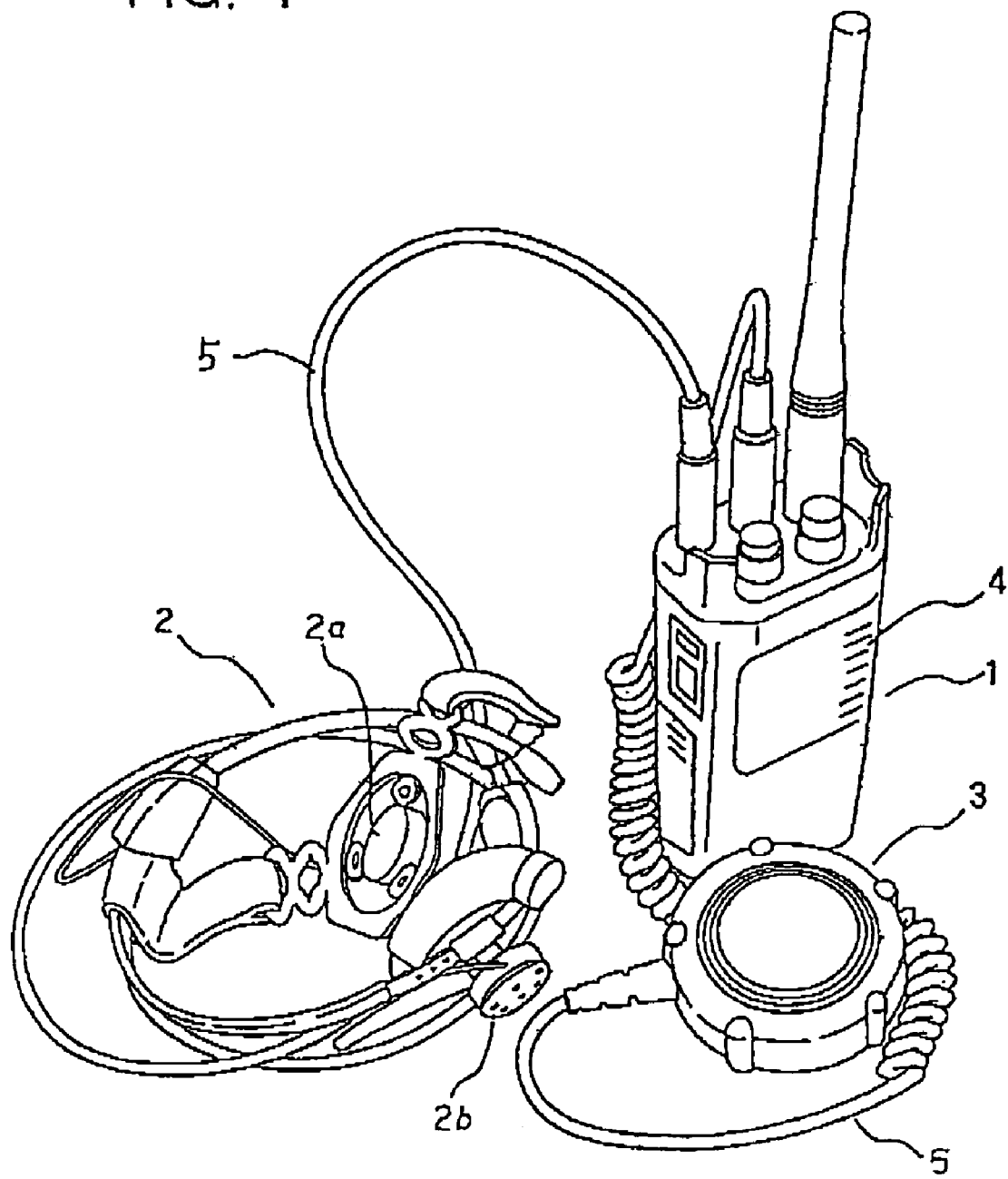
FIG. 1 is a perspective view of a waterproofed transceiver of the present invention.

With reference to the accompanying drawings, embodiments of the present invention will be described. FIG. 1 is a perspective view of a waterproofed transceiver of the present invention. Separately formed into independent units of this transceiver 1 are: a sound input/output portion 2 for inputting and outputting a sound; a PTT (push-to-talk) switch 3 for transmitting an audio signal upon depression of the switch; a main body portion 4 for transmission and reception of a radio signal. Provided in each of these independent units is a signal transmitting/receiving portion to permit each of these independent units to communicate with each other, wherein these independent units are connected with each other through a long-stroke waterproof-type cable 5.

Further, it is possible to perfectly waterproof the sound input/output portion 2 by replacing: a speaker 2b of the sound input/output portion 2 with a bone-conduction type speaker capable of transmitting an inputted sound signal as a bone conduction sound; and, a microphone 2a of the sound input/output portion 2 with a bone-conduction type microphone capable of picking up sound vibrations through human's bone and converting these sound vibrations into a sound signal; respectively.

It is also possible to contain both the bone-conduction type speaker 2b and the bone-conduction type microphone 2a within a perfectly-sealed casing, which realizes perfect waterproofness in such a casing.

In most of salvage operations, a worker operates with his gloves on. Due to this, it is preferably for the PTT switch 3 to be formed into a relatively large sized one, which permits the worker to operates in a precise manner even with the gloves on.

Further, in the case where a completely hands-free operation is required with respect to the transceiver, it is necessary to have a voice-activated switching element (VOX) incorporated in the main body portion 4 of the transceiver, wherein the VOX enables the worker to operate the transceiver using only an audible sound produced through a digital processing of sounds and prevents noises such as wave sounds and engine sounds from disturbing a normal signal transmission.

INDUSTRIAL APPLICABILITY

The present invention is described above. In the transmission of the present invention, it is possible for the user to wear each of the PTT switch, sound input/output portion and the main body portion separately on his preferred portions not interfering with his work. In use, even when the transceiver of the present invention is partially submerged in a severe situation, it is possible for the user to use the transceiver since the transceiver of the present invention is excellent in waterproofness. Furthermore, the transceiver of the present invention is of a hands-free type in use. Due to this, it is preferable for the transceiver of the present invention to be used in salvage operations and the like.

The invention claimed is:

1. A waterproof transceiver comprising: a PTT switch (3) formed to have a relatively large size for ensuring depression of said switch while wearing working gloves; a sound input/output portion (2) for inputting and outputting a sound including a bone conduction type speaker and a bone conduction type microphone each completely enclosed in a case; and a main body portion (4) for transmission and reception of a radio signal; wherein said PTT switch (3) and said sound input/output portion (2) are formed into independent units for said main body portion (4); means for transmitting and receiving a signal between said PTT switch (3) and said main body portion (4) as well as said sound input/output portion (2) and said main body portion (4) is provided; and said PTT switch (3) and said main body portion (4) as well as said sound input/output portion (2) and said main body portion (4) are connected by waterproof cables (5) having lengths permitting a user to fit each component to any position on his/her body.

2. The waterproof transceiver as set forth in claim 1, wherein said means for transmitting and receiving said audio signal is of a voice-activated type.

3. The waterproof transceiver as set forth in claim 1, wherein a digital processing unit s incorporated in the transceiver, wherein said digital processing unit stores a program of an algorism for extracting an audible sound of a human.

* * * * *